United States Patent
Yu et al.

(10) Patent No.: US 10,936,231 B2
(45) Date of Patent: Mar. 2, 2021

(54) ALLOCATING SNAPSHOT GROUP IDENTIFIERS

(71) Applicant: EMC IP Holding Company LLC, Hopkinton, MA (US)

(72) Inventors: Piers Yu, Shanghai (CN); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 16/390,447

(22) Filed: Apr. 22, 2019

(65) Prior Publication Data
US 2020/0333973 A1   Oct. 22, 2020

(51) Int. Cl.
*G06F 3/06* (2006.01)
*G06F 16/11* (2019.01)

(52) U.S. Cl.
CPC .......... *G06F 3/0644* (2013.01); *G06F 3/0608* (2013.01); *G06F 3/0652* (2013.01); *G06F 3/0653* (2013.01); *G06F 16/128* (2019.01)

(58) Field of Classification Search
CPC .... G06F 3/0644; G06F 3/0608; G06F 3/0652; G06F 3/0653; G06F 16/128; G06F 16/11
See application file for complete search history.

(56) References Cited

U.S. PATENT DOCUMENTS

| | | | |
|---|---|---|---|
| 7,403,960 B2 | 7/2008 | Kodama | |
| 7,644,109 B2 | 1/2010 | Manley et al. | |
| 7,849,057 B1 * | 12/2010 | Kazar | G06F 16/128 707/639 |
| 8,380,955 B1 * | 2/2013 | Wu | G06F 3/0632 711/162 |
| 8,645,647 B2 | 2/2014 | Sasson et al. | |
| 8,843,439 B2 | 9/2014 | Shiozawa | |
| 9,354,980 B2 | 5/2016 | Baptist et al. | |
| 9,823,877 B2 | 11/2017 | Vasilyev et al. | |
| 10,176,064 B2 | 1/2019 | Patnaik et al. | |
| 10,191,813 B2 | 1/2019 | Fan et al. | |
| 10,198,213 B2 | 2/2019 | Elisha | |
| 10,261,719 B2 | 4/2019 | Liu et al. | |

* cited by examiner

*Primary Examiner* — Michelle T Bechtold
(74) *Attorney, Agent, or Firm* — BainwoodHuang

(57) ABSTRACT

In response to detecting that at least one snapshot group identifier has been allocated that has a maximum snapshot group identifier value, snapshot group identifiers are allocated to each newly created snapshot group by finding a previously allocated snapshot group identifier that is currently unused, and allocating the previously allocated snapshot group identifier that is currently unused to the newly created snapshot group.

17 Claims, 7 Drawing Sheets

US 10,936,231 B2

ALLOCATING SNAPSHOT GROUP IDENTIFIERS

TECHNICAL FIELD

The present disclosure relates generally to intelligent data storage systems, and more specifically to technology for allocating snapshot group identifiers.

BACKGROUND

Data storage systems are arrangements of hardware and software that include non-volatile data storage devices (e.g. electronic flash drives, magnetic disk drives, and/or optical drives) that are used to provide non-volatile storage for processing host I/O (Input/Output) requests (i.e. write requests and/or read requests) received from one or more host computers. The host I/O requests that are processed by a data storage system may include block I/O requests as well as file I/O requests. The host I/O requests indicate host data that is stored in logical volumes of non-volatile storage that are contained in and maintained by the data storage system.

The data storage system performs various data storage services that organize and secure host data received by the data storage system from the host computers on the non-volatile data storage devices of the data storage system. Some data storage systems provide services that involve or rely on creating and maintaining point in time copies of logical volumes that are commonly referred to as "snapshots". For example, a data storage system may use a snapshot of a logical volume to recover the logical volume in the case of a failure. In another example, a snapshot of a logical volume may be used to roll back the logical volume to the state it was in at the time the snapshot was taken.

SUMMARY

It is often desirable for a data storage system to maintain the relationship between each logical volume and its snapshots. For example, a data storage system may maintain a unique identifier for each "snapshot group", where the snapshot group consists of a base logical volume and a number of snapshots of the base logical volume taken by the data storage system. A snapshot group identifier may be useful during operation of the data storage system under various circumstances. For example, a snapshot group identifier may be useful when the data storage system operates to calculate a total amount of non-volatile storage that is allocated to store a snapshot group, i.e. to store both the base logical volume and all the snapshots of the base logical volume. Multiple copies of the snapshot group identifier may need to be stored in non-volatile storage for each snapshot group, in order to maintain the relationship between the base logical volume and each of the snapshots of the logical volume. For example, within each snapshot group, metadata for the base logical volume, and metadata for each of the snapshots of the logical volume created by the data storage system, may each store at least one copy of the snapshot group identifier.

As the number of snapshot groups that may be created within a data storage system has become larger and larger, previous data storage systems have exhibited drawbacks with regard to the amount of non-volatile data storage that is required to store snapshot group identifiers. In some data storage systems, the total number of snapshot groups existing at a given time may be as high as 2**24 (16777216). At the same time, the length of the snapshot group identifiers used in some previous data storage systems has been designed to be very large, so that allocation of each new snapshot group identifier could be accomplished by simply incrementing a last previously allocated snapshot group identifier, and such that sequential snapshot identifiers could always be allocated without "overflowing" the identifier space (e.g. without ever allocating a total number of snapshot group identifiers that exceeds the largest number that can be represented by a single snapshot group identifier). For example, some previous data storage systems have used snapshot group identifiers having a length of four bytes, in order to avoid ever overflowing the identifier space when allocating new identifiers.

The combination of supporting large numbers of snapshot groups and the use of large snapshot group identifiers has resulted in the total storage requirements for storing snapshot group identifiers in previous data storage systems becoming a significant burden on the storage resources of the data storage systems. For example, in some previous data storage systems in which the total number of snapshot groups may be as high as 2**24, in which the length of each snapshot group identifier is four bytes, and in which one or more snapshot group identifiers must be stored for each snapshot group, the total storage requirement for storing snapshot group identifiers may reach a multiple of {4* (2**24)} bytes.

It would accordingly be desirable to have new technology that can reduce the amount of storage needed within a data storage system to store snapshot group identifiers that are used to maintain the relationships between base logical volumes and the snapshots that are created of the base logical volumes within the data storage system.

To address the above described and other shortcomings of previous technologies, new technology is disclosed herein for allocating a unique snapshot group identifier to each snapshot group contained in a data storage system. In the disclosed technology, in response to detecting that at least one snapshot group identifier having a maximum snapshot group identifier value has previously been allocated, snapshot group identifiers are subsequently allocated to newly created snapshot groups by, for each newly created snapshot group, finding a previously allocated snapshot group identifier that is currently unused, and allocating the previously allocated snapshot group identifier that is currently unused to the newly created snapshot group. In some embodiments, each snapshot group may be made up of a base logical volume and one or more snapshots that are created from that logical volume.

In some embodiments, during a time period extending through a first allocation of a snapshot group identifier having a maximum snapshot group identifier value, snapshot group identifiers may be allocated to newly created snapshot groups as sequential values increasing from a minimum snapshot group identifier value up to the maximum snapshot group identifier value.

In some embodiments, an extent of snapshot group object counters may be created. The counter extent includes a corresponding snapshot group object counter for each snapshot group identifier in the range of identifier values from the minimum snapshot group identifier value up to the maximum snapshot group identifier value. The disclosed technology may detect the creation of each new snapshot group and, in response to detecting the creation of the new snapshot group, set the snapshot group object counter in the counter extent that corresponds to the snapshot group identifier allocated to the newly created snapshot group to one, e.g. indicating that the newly created snapshot group initially contains its base logical volume.

The disclosed technology may further detect the creation of each snapshot in the data storage system and, in response to detecting the creation of each snapshot, increment the snapshot group object counter in the counter extent that corresponds to the snapshot group identifier allocated to the snapshot group to which a base logical volume from which the snapshot was created belongs.

In some embodiments, the disclosed technology may detect the creation of each logical volume in the data storage system. The creation of each logical volume in the data storage system may cause a new snapshot group to be created having the newly created logical volume as the base logical volume.

In some embodiments, the disclosed technology may detect the deletion of a logical volume in the data storage system and, in response to detecting the deletion of the logical volume, decrement the snapshot group object counter that corresponds to the snapshot group identifier allocated to the snapshot group for which the deleted logical volume is the base logical volume. The disclosed technology may also detect the deletion of a snapshot in the data storage system and, in response to detecting the deletion of the snapshot, decrement the snapshot group object counter that corresponds to the snapshot group identifier allocated to the snapshot group to which the deleted snapshot belongs.

In some embodiments, further in response to detecting the deletion of the logical volume, and after decrementing the snapshot group object counter that corresponds to the snapshot group identifier allocated to the snapshot group for which the deleted logical volume is the base logical volume, the disclosed technology may check whether the snapshot group object counter that corresponds to the snapshot group identifier allocated to the snapshot group for which the deleted logical volume is the base logical volume has a value of zero, and in response to detecting that the snapshot group object counter that corresponds to the snapshot group identifier allocated to the snapshot group for which the deleted logical volume is the base logical volume has a value of zero, modify a counter search hint pointer to indicate a segment of counters within the counter extent that includes the snapshot group object counter that corresponds to the snapshot group identifier allocated to the snapshot group for which the deleted logical volume is the base logical volume.

In some embodiments, further in response to detecting the deletion of a snapshot, and after decrementing the snapshot group object counter that corresponds to the snapshot group identifier allocated to the snapshot group to which the deleted snapshot belongs, the disclosed technology may check whether the snapshot group object counter that corresponds to the snapshot group identifier allocated to the snapshot group to which the deleted snapshot belongs has a value of zero, and in response to detecting that the snapshot group object counter that corresponds to the snapshot group identifier allocated to the snapshot group to which the deleted snapshot belongs has a value of zero, modify the counter search hint pointer to indicate a segment of counters within the counter extent that includes the snapshot group object counter that corresponds to the snapshot group identifier allocated to the snapshot group to which the deleted snapshot belongs.

In some embodiments, finding a previously allocated snapshot group identifier that is currently unused may consist of or include finding a snapshot group object counter having a value of zero within the extent of snapshot group object counters, and allocating the previously allocated snapshot group identifier that is currently unused to the newly created snapshot group may consist of or include allocating the snapshot group identifier corresponding to the snapshot object counter having a value of zero to the newly created snapshot group.

In some embodiments, finding the snapshot group object counter having a value of zero within the extent of snapshot group object counters may consist of or include searching the segment of counters within the counter extent indicated by the counter search hint pointer to find the snapshot group counter having a value of zero.

In some embodiments, finding a previously allocated snapshot group identifier that is currently unused may further include verifying whether the snapshot group identifier corresponding to the snapshot group object counter having a value of zero is not currently in use, and allocating the snapshot group identifier corresponding to the snapshot object counter having a value of zero to the newly created snapshot group may be performed only in response to verifying that the snapshot group identifier corresponding to the snapshot group object counter having a value of zero is not currently in use.

Embodiments of the disclosed technology may provide significant improvements over previous technologies. Specifically, embodiments of the disclosed technology may reduce the amount of storage needed within a data storage system to store snapshot group identifiers that are used to maintain the relationships between base logical volumes and the snapshots of those base logical volumes. For example, in the case where an embodiment of the disclosed technology uses snapshot group identifiers of three bytes in length, the storage needed for storing snapshot group identifiers may be reduced by twenty five percent with respect to previous solutions that used snapshot group identifiers of four bytes in length.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. The embodiments described herein are only examples of how features and principles of the invention may be embodied. The invention itself is accordingly broader than the examples described below.

The technology disclosed herein allocates a unique snapshot group identifier to each snapshot group in the snapshot groups contained in a data storage system. In the disclosed technology, each snapshot group may be made up of a base logical volume and one or more snapshots that are created from that logical volume within the data storage system. During a first time period, extending from initialization through a first allocation of a snapshot group identifier having a maximum snapshot group identifier value, the technology described herein allocates snapshot group identifiers to newly created snapshot groups as sequential values increasing from a minimum snapshot group identifier value up to the maximum snapshot group identifier value. The technology disclosed herein then detects that at least one snapshot group identifier has previously been allocated that has the maximum snapshot group identifier value. During a second time period, occurring subsequent to detecting that at least one snapshot group identifier has previously been allocated that has the maximum snapshot group identifier value, the technology disclosed herein allocates a snapshot group identifier to each newly created snapshot group by i) finding a previously allocated snapshot group identifier that is currently unused, and ii) allocating the previously allocated snapshot group identifier that is currently unused to the newly created snapshot group.

Figure 1:
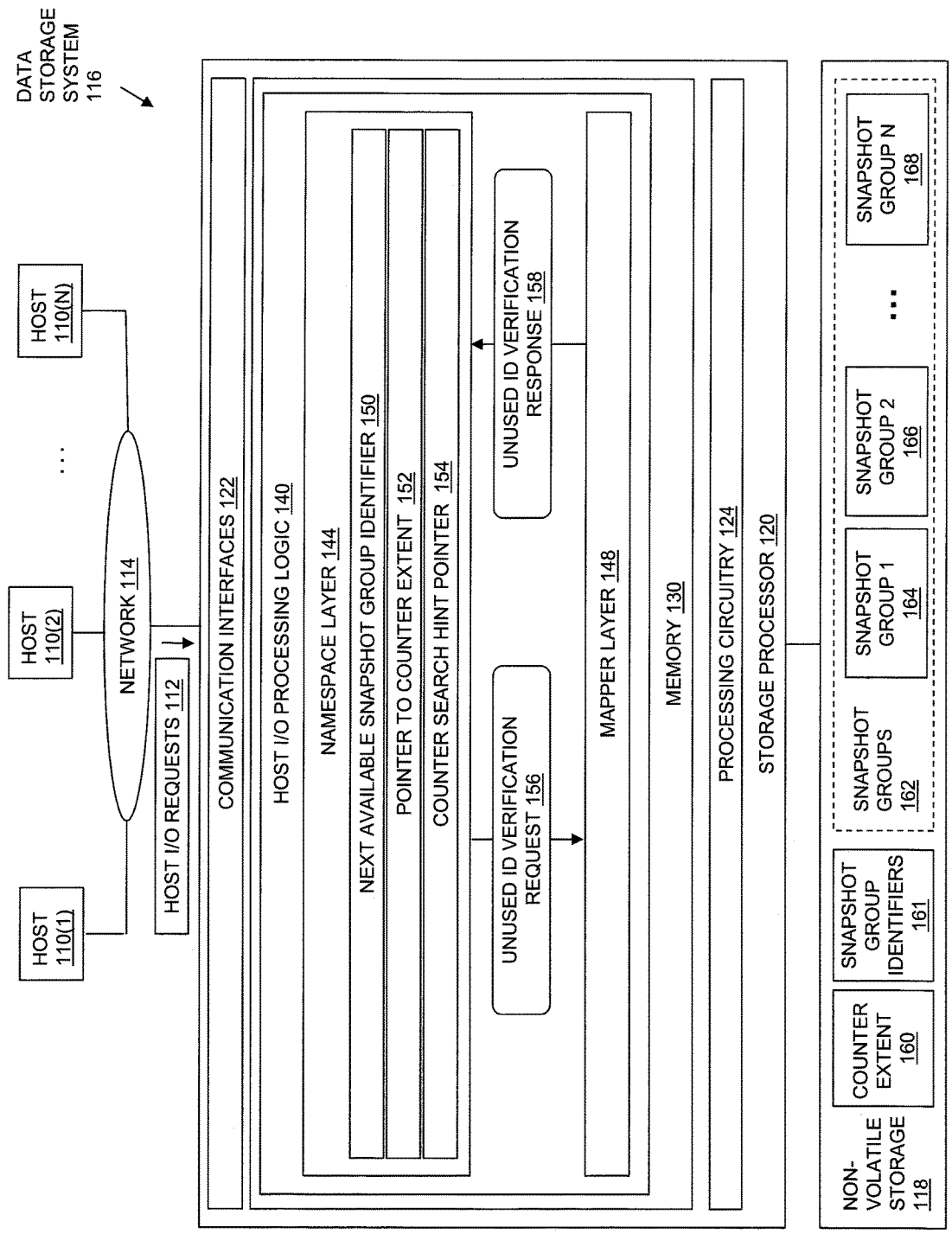
FIG. 1 is a block diagram showing an example of an operational environment and an example of components in an illustrative embodiment.

FIG. 1 shows an example of an operational environment in which embodiments of the technology disclosed herein can operate, including an illustrative embodiment of the disclosed technology. As shown in FIG. 1, one or more host computers ("Hosts"), shown as host computers 110(1) through 110(N), and/or host applications executing in whole or in part on host computers 110(1) through 110(N), access non-volatile storage provided by Data Storage System 116 over a Network 114. Data Storage System 116 includes at least one Storage Processor 120 and Non-Volatile Storage 118. Data Storage System 116 may include one or more storage processors like Storage Processor 120. In some embodiments, multiple storage processors may be provided as circuit board assemblies, or "blades," which plug into a chassis that encloses and cools the storage processor. Those skilled in the art will recognize, however, that no particular configuration of storage processors is required, as any number of storage processors, including a single storage processor, may be provided and that Storage Processor 120 may be any type of computing device that is capable of processing host I/O requests.

Non-Volatile Storage 118 may include or consist of some number of disk drives. The disk drives in Non-Volatile Storage 118 may include magnetic disk drives, electronic flash drives, optical drives, and/or other types of non-volatile data storage drives or devices. In some embodiments, Non-Volatile Storage 118 may, for example, be organized into RAID groups, where each RAID group is composed of multiple disk drives in Non-Volatile Storage 118.

Network 114 may include or consist of any type of network or combination of networks, such as, for example, a storage area network (SAN), a local area network (LAN), a wide area network (WAN), the Internet, and/or some other type of network or combination of networks.

Hosts 110(1-N) and/or host applications executing in whole or in part on Hosts 110(1-N) may logically connect to and communicate with the Storage Processor 120 using various technologies. For example, Host I/O Requests 112 conveyed from Hosts 110(1-N) to Storage Processor 120 may include block I/O requests (read requests and/or write requests) communicated from Hosts 110(1-N) to Storage Processor 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 112 conveyed from Hosts 110(1-N) to Storage Processor 120 may further include file I/O requests (read requests and/or write requests) communicated from Hosts 110(1-N) to the Storage Processor 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Storage Processor 120 is accordingly configured to receive host I/O requests through both block-based and file-based storage protocols, and to respond to host I/O requests of either type by reading or writing the Non-Volatile Storage 118.

Storage Processor 120 may include one or more Communication Interfaces 122, Processing Circuitry 124, and Memory 130. The Communication Interfaces 122 of Storage Processor 120 may include, for example, SCSI target adapters and/or network interface adapters that convert electronic and/or optical signals received over Network 114 into electronic form for use by Storage Processor 120.

Processing Circuitry 124 may be embodied as at least one processor core that is capable of independently reading and executing threads of program instructions as they are scheduled for execution. Processing Circuitry 124 may be integrated into a single central processing unit chip or chip package. Processing Circuitry 124 may be a subset of the processor cores contained in Storage Processor 120, or may be the only processor core contained in Storage Processor 120.

Memory 130 may include both volatile memory (e.g., RAM), and/or non-volatile memory (e.g. ROM, disk drives, solid state drives, portions of Non-Volatile Storage 118, etc.). Processing Circuitry 124 and Memory 130 together may form specialized control circuitry, which is constructed and arranged to carry out specific methods and functions as described herein. As shown in FIG. 1, Memory 130 stores specialized software components and data structures that may be provided at least in part in the form of executable program instructions. When the executable instructions of the software components shown in FIG. 1 are executed by Processing Circuitry 124, Processing Circuitry 124 performs the methods and functionality of the software. Although certain specific software constructs are shown in FIG. 1 and described herein, those skilled in the art will recognize that Memory 130 may further include various other types of software constructs, which are not shown.

In the example of FIG. 1, the software components in Memory 130 include Host I/O Processing Logic 140, which provides program logic for processing and supporting the processing of the Host I/O Requests 112 received by Storage Processor 120. Host I/O Requests 112 processed by Host I/O Processing Logic 140 may include host I/O requests (e.g. host I/O read requests, host I/O write requests) directed to various types of block data objects hosted by Data Storage System 116 using Non-Volatile Storage 118, such as logical disks (e.g. logical units sometimes referred to as LUNs) and/or block-based virtual volumes (VVols). Host I/O Requests 112 processed by Host I/O Processing Logic 140 may also or alternatively include host I/O requests (e.g. host I/O read requests, host I/O write requests) directed to file data objects hosted by Data Storage System 116 using Non-Volatile Storage 118, such as files or file systems.

During operation, Host I/O Processing Logic 140 creates logical volumes of non-volatile storage allocated from the Non-Volatile Storage 118 to store host data received in and/or indicated by the Host I/O Requests 112. Each logical volume created by Host I/O Processing Logic 140 may store one or more of the host accessible data objects that are hosted by Data Storage System 116. Host I/O Processing Logic 140 may also create and maintain some number of (e.g. one or more) point in time copies of each logical volume. The point in time copies created by Host I/O Processing Logic 140 from a given logical volume are referred to as the "snapshots" of that logical volume, and the logical volume is referred to as the "base logical volume" for those snapshots. The snapshots created and maintained by Host I/O Processing Logic 140 may be used (e.g. by Host I/O Processing Logic 140) for various purposes. For example, one or more of the snapshots of a base logical volume may be used by Host I/O Processing Logic 140 to recover the base logical volume in the case of a failure. In another example, Host I/O Processing Logic 140 may use a snapshot of a base logical volume to roll back the state of the base logical volume (e.g. the host data contents stored in the base logical volume) to the state of the base logical volume at the time the snapshot was taken.

During operation of the components of FIG. 1, Namespace Layer 144 in Host I/O Processing Logic 140 maintains relationships between each base logical volume and its snapshots. Specifically, Namespace Layer 144 organizes each base logical volume in Data Storage System 116 and the snapshots of that base logical volume that are created by Host I/O Processing Logic 140 data storage system base into a separate "snapshot group", as illustrated by Snapshot Groups 162. For example, Snapshot Groups 162 is shown consisting of Snapshot Group 1 164, Snapshot Group 2 166, and so on through Snapshot Group N 168. As part of maintaining the relationships between each base logical volume and its snapshots, Namespace Layer 144 allocates a unique identifier for each snapshot group, referred to herein for purposes of explanation as a "snapshot group identifier". The snapshot group identifiers allocated by Namespace Layer 144 are shown for purposes of illustration in FIG. 1 by Snapshot Group Identifiers 161. The snapshot group identifier for a specific snapshot group may be used by Host I/O Processing Logic 140 for various purposes. For example, a snapshot group identifier for a specific snapshot group may be used by Host I/O Processing Logic 140 to identify all the storage objects within a snapshot group while calculating a total amount of non-volatile storage that is allocated to store the snapshot group, i.e. the amount of storage that is being used to store both the base logical volume and all the snapshots of the base logical volume within the snapshot group. One or more copies of each snapshot group identifier may be stored in Non-Volatile Storage 118, in order to maintain the relationships between the base logical volume and each of the snapshots of the base logical volume contained in the snapshot group to which the snapshot group identifier is allocated.

For example, in some embodiments, one or more copies of the snapshot group identifier allocated to a snapshot group may be stored in Non-Volatile Storage 118 in metadata describing the snapshot group, metadata describing the base logical volume, and/or metadata describing each of the snapshots of the base logical volume that are created by the data storage system.

Further during operation of the components of FIG. 1, in order to allocate a unique snapshot group identifier to each snapshot group that currently exists in Snapshot Groups 162, Namespace Layer 144 may initially operate during a time period that extends from system initialization through a first allocation of a snapshot group identifier having a maximum snapshot group identifier value, by allocating snapshot group identifiers to newly created snapshot groups in Snapshot Groups 162 as sequential values increasing from a minimum snapshot group identifier value up to the maximum snapshot group identifier value. For example, in some embodiments, the minimum snapshot group identifier value may be one, and the maximum snapshot identifier value may be the largest value that can be represented by a single snapshot group identifier. During the time period from initialization through the first allocation of a snapshot group identifier having maximum snapshot group identifier value, snapshot group identifiers may be allocated as a series of sequential values, starting with allocation of a snapshot group identifier having a value of one, followed by allocation of a snapshot group identifier having a value of two, followed by allocation of a snapshot group identifier having a value of three, and so on through the first allocation of a snapshot group identifier having a value equal to the maximum snapshot group identifier value. In some embodiments in which each snapshot group identifier is three bytes in length, the largest value that can be represented by a snapshot group identifier is $224$, and accordingly the maximum snapshot identifier value may be set to $224$. Those skilled in the art will recognize that the disclosed technology is not limited to embodiments using these specific examples of values for snapshot group identifier length, minimum snapshot identifier value, and maximum snapshot identifier value, and that various other specific values may be used in alternative embodiments and/or configurations.

For example, in some embodiments, at initialization, prior to creation of any snapshot groups, Namespace Layer 144 may set Next Available Snapshot Group Identifier 150 to the minimum snapshot group identifier value (e.g. 1). As each new snapshot group is created, Namespace Layer 144 may allocate a snapshot group identifier to the newly created snapshot group that is equal to the current value of Next Available Snapshot Group Identifier 150, and then increment Next Available Snapshot Group Identifier 150. Eventually, Next Available Snapshot Group Identifier 150 is incremented to a value that is greater than the maximum snapshot group identifier value. At that point, a snapshot group identifier has been allocated that has the maximum snapshot identifier value. In some embodiments, the value of Next Available Snapshot Group Identifier 150 subsequently stays at a value that is greater than the maximum snapshot group identifier value until the next system initialization, and during that time one or more allocated snapshot group identifiers having a value equal to the maximum snapshot identifier may become unused and then reallocated. Accordingly, a value of Next Available Snapshot Identifier 150 that is greater than the maximum snapshot identifier value may be used in some embodiments as an indication that at least one snapshot group identifier has previously been allocated having a value equal to the maximum snapshot group identifier value.

Namespace Layer 144 detects that at least one snapshot group identifier has previously been allocated that has the maximum snapshot group identifier value, e.g. by detecting, e.g. at the time a new snapshot group is created, that Next Available Snapshot Group Identifier 150 exceeds the maximum snapshot identifier value. In response to detecting that at least one snapshot group identifier has previously been allocated having the maximum snapshot group identifier value, Namespace Layer 144 allocates snapshot group identifiers to newly created snapshot groups in Snapshot Groups 162 by, for each newly created snapshot group, finding a previously allocated snapshot group identifier that is currently unused, and allocating the previously allocated snapshot group identifier that is currently unused to the newly created snapshot group. In this way Namespace Layer 144 ensures that each snapshot group in Snapshot Groups 162 is allocated a snapshot group identifier that is unique within the snapshot group identifiers that are currently in use, while re-using previously allocated snapshot group identifiers that are no longer in use. Namespace Layer 144 as disclosed herein thereby advantageously enables relatively smaller sized snapshot group identifiers to be used than were used in previous data storage systems, resulting in storage savings with regard to the amount of Non-Volatile Storage 118 that is required to store Snapshot Group Identifiers 161.

In some embodiments, Namespace Layer 144 may create (e.g. allocate) an extent of snapshot group object counters within Data Storage System 116, as shown by Counter Extent 160. Namespace Layer 144 may also maintain a pointer to Counter Extent 160, as shown by Pointer to Counter Extent 152. Counter Extent 160 may be used to store snapshot group object counters that correspond to individual snapshot group identifier values. Counter Extent 160 contains a corresponding snapshot group object counter for each snapshot group identifier value within the range of snapshot group identifier values from the minimum snapshot group identifier value through the maximum snapshot group identifier value. Namespace Layer 144 may detect the creation of each new snapshot group in Snapshot Groups 162. For example, in some embodiments, Namespace Layer 144 may detect the creation of each logical volume in Data Storage System 116, and the creation of each logical volume in Data Storage System 116 may cause Namespace Layer 144 to create a new snapshot group in Snapshot Groups 162, having the newly created logical volume as the base logical volume.

When Namespace Layer 144 detects the creation of a new snapshot group in Snapshot Groups 162, it may initialize the snapshot group object counter in Counter Extent 160 that corresponds to the value of the snapshot group identifier allocated to the newly created snapshot group by setting it to one, e.g. indicating that the newly created snapshot group contains only its base logical volume.

In some embodiments, Namespace Layer 144 may detect the creation of each snapshot that is created in Data Storage System 116. In response to detecting the creation of a snapshot, Namespace Layer 144 may increment the snapshot group object counter in Counter Extent 160 that corresponds to the value of the snapshot group identifier allocated to the snapshot group in Snapshot Groups 162 that contains the snapshot, e.g. the snapshot group object counter in Counter Extent 160 that corresponds to the value of the snapshot group identifier allocated to the snapshot group in Snapshot Groups 162 that contains the base logical volume from which the snapshot was created.

In some embodiments, Namespace Layer 144 may detect each deletion of a logical volume in the Data Storage System 116. In response to detecting the deletion of a logical volume, Namespace Layer 144 may decrement the snapshot group object counter in Counter Extent 160 that corresponds to the snapshot group identifier allocated to the snapshot group for which the deleted logical volume is the base logical volume, e.g. the counter that corresponds to the snapshot group identifier allocated to the snapshot group that includes the deleted logical volume as its base logical volume.

Namespace Layer 144 may also detect each deletion of a snapshot in the Data Storage System 116. In response to detecting the deletion of a snapshot, Namespace Layer 144 may decrement the snapshot group object counter in Counter Extent 160 that corresponds to the snapshot group identifier allocated to the snapshot group to which the deleted snapshot belongs, e.g. the counter that corresponds to the snapshot group identifier allocated to the snapshot group that contained the deleted snapshot.

In some embodiments, further in response to detecting the deletion of a logical volume, and after decrementing the snapshot group object counter that corresponds to the snapshot group identifier allocated to the snapshot group in which the deleted logical volume is the base logical volume, Namespace Layer 144 may i) check whether the snapshot group object counter in Counter Extent 160 that corresponds to the snapshot group identifier allocated to the snapshot group in which the deleted logical volume is the base logical volume has a value of zero, and ii) in response to detecting that the snapshot group object counter that corresponds to the snapshot group identifier allocated to the snapshot group in which the deleted logical volume is the base logical volume has a value of zero, modify a counter search hint pointer to indicate a segment of counters within Counter Extent 160 that includes the snapshot group object counter that corresponds to the snapshot group identifier allocated to the snapshot group in which the deleted logical volume is the base logical volume. For example, Counter Extent 160 may be made up of some number of discrete segments that each consist of one page of non-volatile storage, e.g. Counter Extent 160 may be made up of some number of pages, each having the same length, such as four kilobytes, or some other predetermined length. In response to detecting that the snapshot group object counter corresponding to the snapshot group identifier allocated to a snapshot group for which a deleted logical volume is the base logical volume has a value of zero, Namespace Layer 144 may modify Counter Search Hint Pointer 154 to point to the page within Counter Extent 160 that contains the snapshot group object counter that corresponds to the snapshot group identifier allocated to the snapshot group in which the deleted logical volume is the base logical volume. In this way, Counter Search Hint Pointer 154 may be used by Namespace Layer 144 to store a pointer to a page of counters within Counter Extent 160 that is at least likely to include at least one counter having a value of zero, in order to provide for a quick identification by Namespace Layer 144 in some embodiments of a counter having a value of zero, and accordingly identify a previously allocated snapshot group identifier that is no longer being used, and that is therefore available or potentially available for re-allocation.

In some embodiments, further in response to detecting the deletion of a snapshot in Data Storage System 116, and after decrementing the snapshot group object counter in Counter Extent 160 that corresponds to the snapshot group identifier allocated to the snapshot group to which the deleted snapshot belongs, Namespace Layer 144 may i) check whether the snapshot group object counter that corresponds to the snapshot group identifier allocated to the snapshot group to which the deleted snapshot belongs has a value of zero, and ii) in response to detecting that the snapshot group object counter that corresponds to the snapshot group identifier allocated to the snapshot group to which the deleted snapshot belongs, modify Counter Search Hint Pointer 154 to indicate (e.g. point to) a segment of counters (e.g. a page of counters) within Counter Extent 160 that includes the snapshot group object counter that corresponds to the snapshot group identifier allocated to the snapshot group to which the deleted snapshot belongs. This action by Namespace Layer 144 will also cause Counter Search Hint Pointer 154 to store a pointer to a page of counters within Counter Extent 160 that is at least likely to include at least one snapshot group object counter having a value of zero, thereby decreasing the time needed to find a snapshot group object counter having a value of zero within Counter Extent 160 and accordingly identify a previously allocated snapshot group identifier that is no longer being used, and that is therefore available or potentially available for re-allocation.

In some embodiments, Namespace Layer 144 may find a previously allocated snapshot group identifier that is currently unused at least in part by finding a snapshot group object counter in Counter Extent 160 having a value of zero. For example, Namespace Layer 144 may first search the segment (e.g. page) within Counter Extent 160 that is indicated by Counter Search Hint Pointer 154 to determine if any snapshot group object counters within that page have a value of zero. If none of the snapshot group object counters within the segment of Counter Extent 160 that is indicated by Counter Search Hint Pointer 154 have a value of zero, then Namespace Layer 144 may search the next segment in Counter Extent 160 for a counter having a value of zero, and so on through Counter Extent 160 until a counter is found with a value of zero. In some embodiments, the snapshot group identifier that corresponds to the counter found by Namespace Layer 144 having a value of zero is considered to be a previously allocated snapshot group identifier that is currently unused. Accordingly, in some embodiments, Namespace Layer 144 may then allocate (i.e. reallocate) the previously allocated snapshot group identifier that is currently unused to a newly created snapshot group by allocating the snapshot group identifier corresponding to the snapshot object counter having a value of zero to a newly created snapshot group.

In other embodiments, finding a previously allocated but currently unused snapshot group identifier may further include Namespace Layer 144 verifying whether the snapshot group identifier corresponding to the snapshot group object counter having a value of zero is not currently in use, and Namespace Layer 144 may allocate the snapshot group identifier corresponding to the snapshot object counter having a value of zero to the newly created snapshot group only in response to verifying that the snapshot group identifier corresponding to the snapshot group object counter having a value of zero is not currently in use. For example, Mapper Layer 148 may perform various operations during the processing of Host I/O Requests 112. In some embodiments, Mapper Layer 148 may map portions (e.g. logical blocks) of the logical volumes contained in Data Storage System 116 to corresponding portions (e.g. physical blocks) of non-volatile storage in Non-Volatile Storage 118, and use the portions of non-volatile storage to store the host data that is directed to the corresponding portions of the logical volumes while Host I/O Requests 112 are being processed. In some scenarios in some embodiments, even after a snapshot group object counter corresponding to a previously allocated snapshot group identifier has been decremented to zero, the snapshot group identifier may still be in use by Mapper Layer 148, e.g. while Mapper Layer 148 completes the processing of one or more previously received requests in Host I/O Requests 112. Accordingly, in some embodiments, before reallocating a previously allocated snapshot group identifier with a corresponding counter having a value of zero, Namespace Layer 144 may need to verify with Mapper Layer 148 that the snapshot group identifier is not currently in use by Mapper Layer 148.

For example, in some embodiments, in response to finding at least one snapshot group object counter having a value of zero, Namespace Layer 166 may transmit an Unused ID Verification Request 156 to Mapper Layer 148. The Unused ID Verification Request 156 may request that Mapper Layer 148 verify whether one or more snapshot group identifiers indicated by Unused ID Verification Request 156 are still in use. For example, in some embodiments, Unused ID Verification Request 156 may request that Mapper Layer 148 verify whether any snapshot group identifiers corresponding to counters having a value of zero within the page of Counter Extent 160 currently indicated by Counter Search Hint Pointer 154 are still in use. In some embodiments, Unused ID Verification Request 156 may include a bit map indicating which counters within the page of Counter Extent 160 indicated by Counter Search Hint Pointer 154 have a value of zero. In response to receive of Unused ID Verification Request 156, Mapper Layer 148 determines whether the counter or counters indicated by Unused ID Verification Request 156 as having a zero counter value is/are currently in use. Mapper Layer 148 then returns Unused ID Verification Response 158 to Namespace Layer 144. Unused ID Verification Response 158 indicates whether the counter or counters indicated by Unused ID Verification Request 156 as having a zero counter value are currently in use. For example, Unused ID Verification Response 158 may include a modified version of the bit map provided in Unused ID Verification Request 156, indicating only those counters within the page of Counter Extent 160 indicated by Counter Search Hint Pointer 154 that both i) have a value of zero, and ii) are not currently in use by Mapper Layer 148. In this way Namespace Layer 144 may verify with Mapper Layer 148 that one or more snapshot group identifiers having a corresponding counter value of zero are not currently in use before reallocating any of those snapshot group identifiers.

Figure 2:
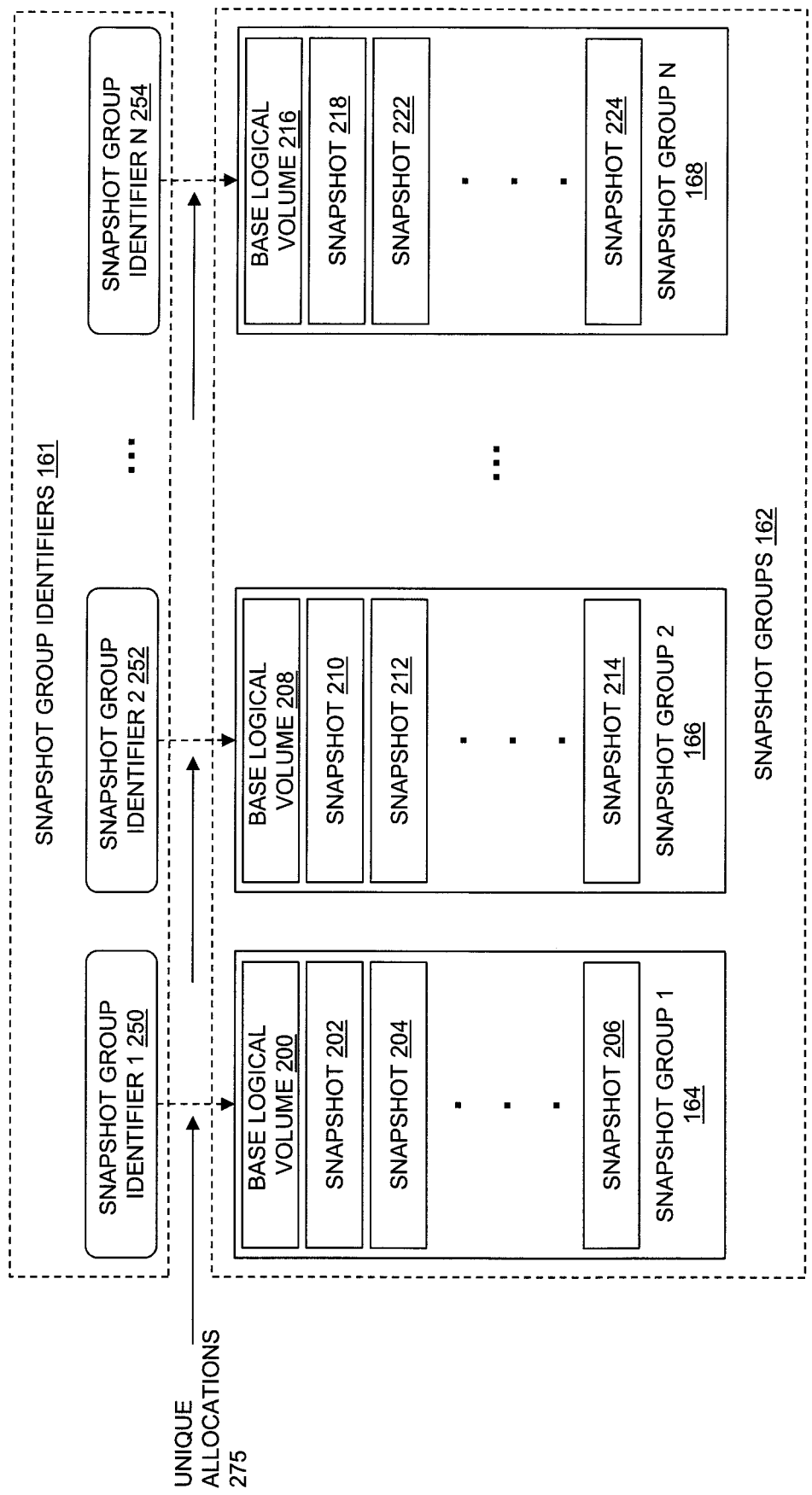
FIG. 2 is a block diagram showing an example of snapshot groups in some embodiments, and showing that each snapshot group is allocated a unique snapshot group identifier.

FIG. 2 is a block diagram showing an example of snapshot groups in some embodiments, and showing that each snapshot group is allocated a unique snapshot group identifier. As shown in FIG. 2, Snapshot Group Identifiers 161 may include Snapshot Group Identifier 1 250, Snapshot Group Identifier 2 252, and so on through Snapshot Group Identifier N 254.

As also shown in FIG. 2, Snapshot Groups 162 may include Snapshot Group 1 164, Snapshot Group 2 166, and so on through Snapshot Group N 168.

Each snapshot group is made up of a base logical volume, and some number of snapshots taken of the base logical volume. In the example of FIG. 2, Snapshot Group 1 164 includes Base Logical Volume 200 and the snapshots created from Base Logical Volume 200, shown by Snapshot 202, Snapshot 204, and so on through Snapshot 206. Snapshot Group 2 is shown including a Base Logical Volume 208, and the snapshots created from Base Logical Volume 208, as shown by Snapshot 210, Snapshot 212, and so on through Snapshot 214. Further for purposes of illustration, Snapshot Group N 168 is shown including a Base Logical Volume 216 and the snapshots created from Base Logical Volume 216, shown by Snapshot 216, Snapshot 218, and so on through Snapshot 224. Those skilled in the art will recognize that the number of snapshots in a snapshot group may vary, and that some snapshot groups may include more snapshots than other snapshot groups. In some embodiments, a snapshot group may at some times have no snapshots, and/or be created immediately upon creation of the base logical volume for the snapshot group.

As described herein and also illustrated by Unique Allocations 275 in FIG. 2, each snapshot group identifier in Snapshot Group Identifiers 161 may be uniquely allocated to one of the snapshot groups in Snapshot Groups 162. In some embodiments, Snapshot Group Identifiers 161 may include only those snapshot group identifiers that are currently in use. Accordingly, while at any given time each snapshot group identifier that is currently in use is uniquely allocated to a snapshot group, the disclosed system may operate such that after an allocated snapshot group identifier is no longer being used (e.g. to maintain relationships in the snapshot group that it was last allocated to), that snapshot group identifier may no longer be one of the allocated snapshot identifiers contained in Snapshot Group Identifiers 161, and may accordingly be subsequently reallocated to another snapshot group.

Figure 3:
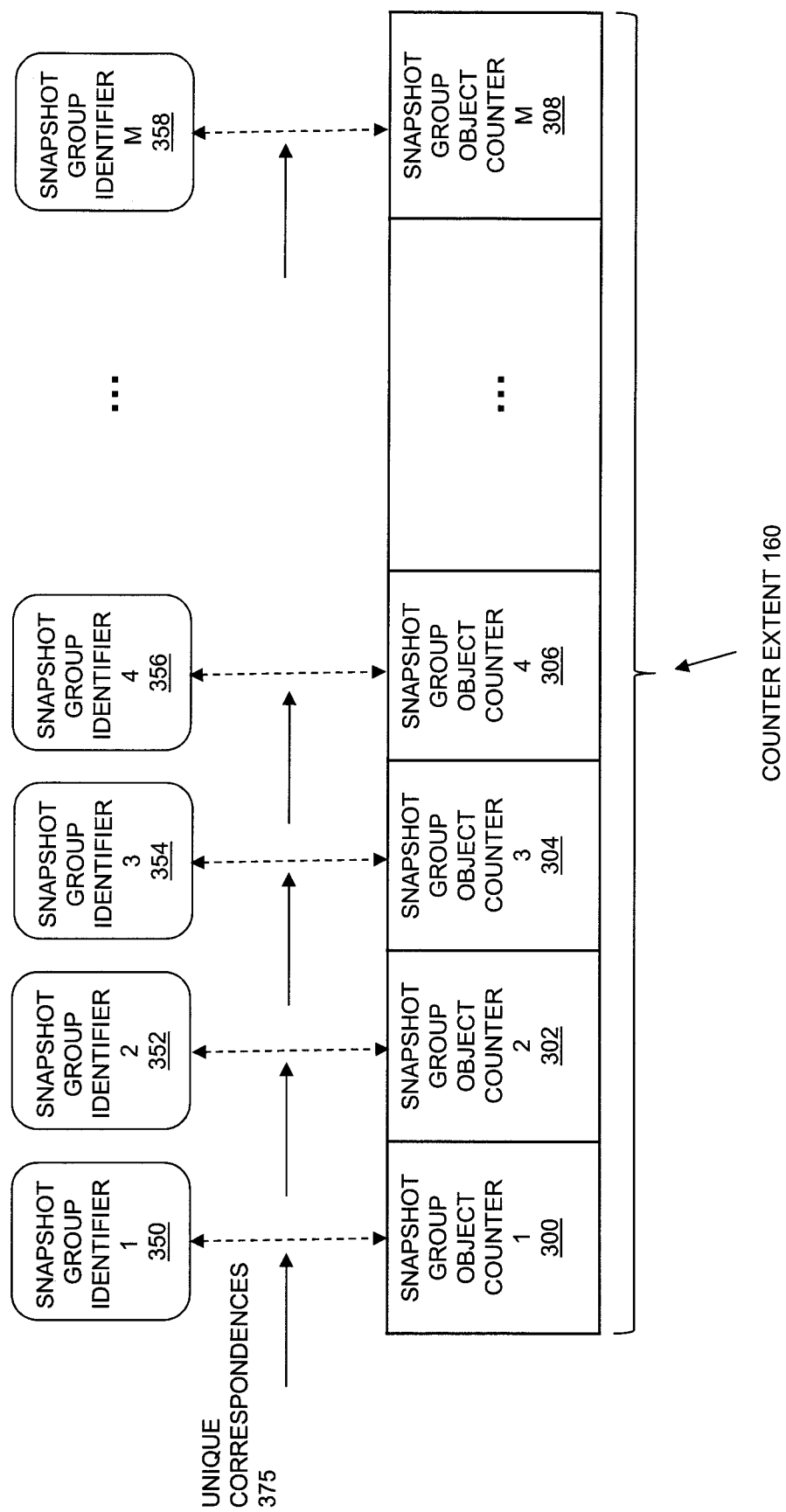
FIG. 3 is a block diagram showing an example of an extent of snapshot group object counters in some embodiments, and showing that each snapshot group object counter corresponds to one and only one snapshot group identifier.

FIG. 3 is a block diagram showing an example of an extent of snapshot group object counters in some embodiments, and showing that each snapshot group object counter corresponds to one and only one snapshot group identifier. As shown in FIG. 3, Counter Extent 160 may include some number of snapshot group object counters, as shown by Snapshot Group Object Counter 1 300, Group Object Counter 2 302, Group Object Counter 3 304 Group Object Counter 4 306, and so on through Group Object Counter M 308.

As shown by Unique Correspondences 375 in FIG. 3, each snapshot group object counter in Counter Extent 160 corresponds to a single snapshot group identifier value. For example, Snapshot Group Identifier 1 350 corresponds to Snapshot Group Object Counter 1 300, Snapshot Group Identifier 2 352 corresponds to Snapshot Group Object Counter 2 302, Snapshot Group Identifier 3 354 corresponds to Snapshot Group Object Counter 3 304, Snapshot Group Identifier 4 356 corresponds to Snapshot Group Object Counter 4 306, and so through Snapshot Group Identifier M 358, which corresponds to Snapshot Group Object Counter M 308. In this way, Counter Extent 160 includes a snapshot group object counter for every potential value of a snapshot object counter. While a given snapshot group identifier has been allocated and is currently in use, the corresponding snapshot object counter contains the total number of storage objects in the snapshot group to which the snapshot group identifier is allocated. For example, while Snapshot Group Identifier 1 350 is allocated to a snapshot group, and is currently in use to maintain the relationships between the storage objects in that snapshot group, Snapshot Group Object Counter 1 300 contains the number of storage objects in that snapshot group. Accordingly, if the snapshot group to which Snapshot Group Identifier 1 350 has been allocated includes a base logical volume and three snapshots of that base logical volume, Snapshot Group Object Counter 1 300 contains the number 4. Similarly, if the snapshot group to which Snapshot Group Identifier 2 352 has been allocated includes a base logical volume and one snapshot of that base logical volume, Snapshot Group Object Counter 2 302 contains the number 2. In some embodiments, in the case where a snapshot group object counter has been decremented to a value of zero, the corresponding snapshot group identifier may be determined to be unused, and therefore available for reallocation. Alternatively, in other embodiments, in the case where a snapshot group object counter has been decremented to a value of zero, the corresponding snapshot group identifier may be determined to be potentially unused, subject to verification with the Mapper Layer 148 that the snapshot group identifier is actually currently unused and therefore available for reallocation.

Figure 4:
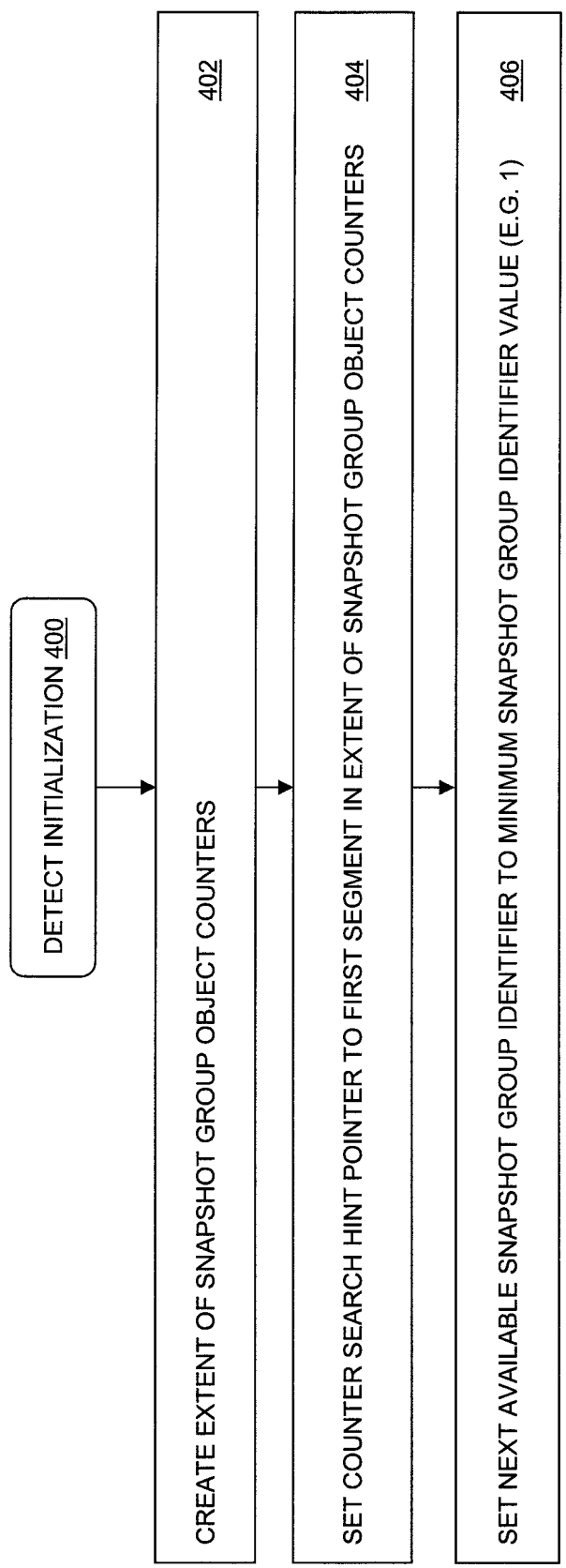
FIG. 4 is a flow chart showing an example of steps that may be performed in some embodiments to perform system initialization.

FIG. 4 is a flow chart showing an example of steps that may be performed in some embodiments to perform system initialization. The steps of FIG. 4 may, for example, be performed in whole or in part by Namespace Layer 144 shown in FIG. 1. At 400, an initialization event is detected. For example, the initialization event may include or consist of initialization of the Data Storage System 116, initialization of some or all of the devices in Non-Volatile Storage 118, and/or initialization of some or all of the components shown in Storage Processor 120.

In response to the initialization event detected at 400, at step 402 an extent of snapshot group object counters is created. For example, Counter Extent 160 may be allocated in Non-Volatile Storage 118, and a pointer to Counter Extent 160 stored in Pointer to Counter Extent 152.

At step 404, a counter search hint pointer may be set to indicate a first segment of the extent of snapshot group counters. For example, Counter Search Hint Pointer 154 may be set to indicate the first page of counters within Counter Extent 160.

At step 406, a next available snapshot group identifier may be set to a minimum snapshot group identifier value. For example, Next Available Snapshot Group Identifier 150 may be set to 1 at step 406.

Figure 5:
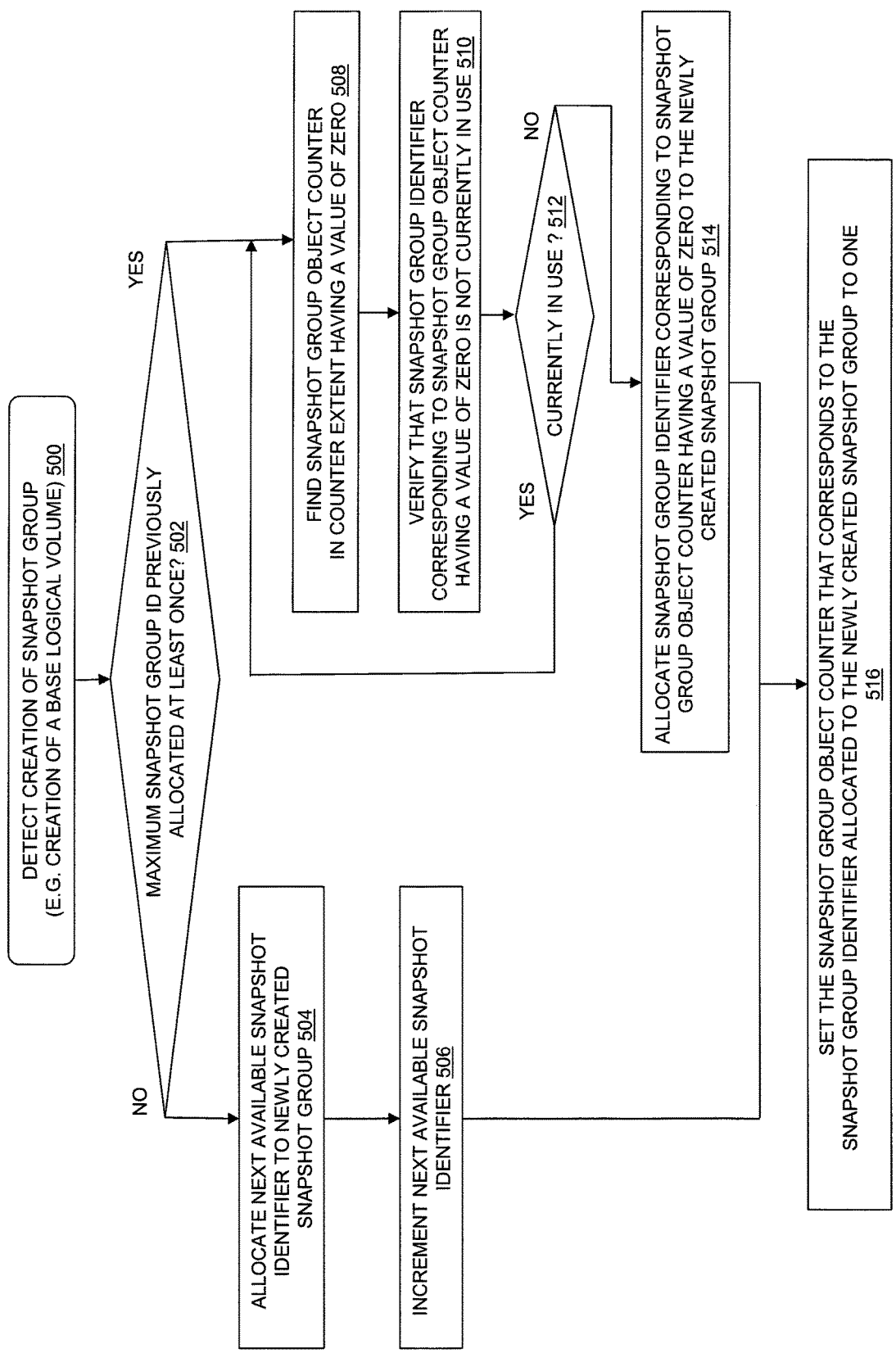
FIG. 5 is a flow chart showing an example of steps that may be performed in some embodiments in response to detecting the creation of a snapshot group.

FIG. 5 is a flow chart showing an example of steps that may be performed in some embodiments in response to detecting the creation of a snapshot group. The steps of FIG. 5 may, for example, be performed in whole or in part by Namespace Layer 144 shown in FIG. 1. At 500, creation of a new snapshot group is detected. For example, creation of a new logical volume may be detected at 500, causing a new snapshot group to be created having the newly created logical volume as the base logical volume (i.e. a new snapshot group that contains the newly created logical volume).

In response to detecting the creation of a new snapshot group, at step 502 the disclosed technology detects whether a snapshot group identifier has previously been allocated having the maximum snapshot group identifier value. For example, at step 502 the value of Next Available Snapshot Group Identifier 150 may be compared to the maximum snapshot group identifier value. If Next Available Snapshot Group Identifier 150 is greater than the maximum snapshot group identifier value, then at least one snapshot group identifier has previously been allocated having the maximum snapshot group identifier value, and step 502 is followed by step 508. Otherwise, if Next Available Snapshot Group Identifier 150 is not greater than the maximum snapshot group identifier value, then no snapshot group identifier has previously been allocated having the maximum snapshot group identifier value, and step 502 is followed by step 504. Steps 504 and 506 are examples of steps performed prior to allocation of a snapshot group identifier having the maximum snapshot group identifier value, and steps 508, 510, 512, and 514 are examples of steps performed in response to detecting that at least one snapshot group identifier having the maximum snapshot group identifier has previously been allocated. Steps 500 and 516 may be performed both before allocation of a snapshot group identifier having the maximum snapshot group identifier value, and after allocation of one or more snapshot group identifiers have been allocated having the maximum snapshot group identifier value.

At step 504, a next available snapshot identifier is allocated to the snapshot group of the newly created snapshot group, e.g. to the snapshot group containing the newly created logical volume. For example, a snapshot group identifier equal to the value of Next Available Snapshot Group Identifier 150 may be allocated to the newly created snapshot group.

At step 506, the next available snapshot identifier is incremented. For example, the value of Next Available Snapshot Group Identifier 150 may be allocated. Step 506 is followed by step 516, in which the snapshot group object counter that corresponds to the snapshot group identifier allocated to the newly created snapshot group is set to one.

At step 508, a snapshot group object counter having a value of zero is located in the counter extent. For example, a snapshot group object counter having a value of zero is located in Counter Extent 160.

At step 510, the disclosed technology verifies that the snapshot group identifier corresponding to snapshot group object counter having a value of zero identified at step 508 is not currently in use. For example, Namespace Layer 144 may verify with Mapper Layer 148 that the snapshot group identifier corresponding to the snapshot group object counter having a value of zero identified in step 508 is currently unused.

At step 512, the disclosed technology branches based on whether the snapshot group identifier corresponding to the snapshot group object counter having a value of zero identified in step 508 is currently unused. For example, in the case where Namespace Layer 144 verifies that the snapshot group identifier corresponding to the snapshot group object counter having a value of zero identified in step 508 is currently unused, then step 512 is followed by step 514. Alternatively, in the case where Namespace Layer 144 determines at step 510 that the snapshot group identifier corresponding to the snapshot group object counter having a value of zero identified in step 508 is still currently in use, then after step 512 Namespace Layer 144 goes back to step 508 to find another counter having a value of zero.

At step 514, the snapshot group identifier corresponding to the snapshot group object counter having a value of zero is allocated to the newly created snapshot group, e.g. to the snapshot group created in response to creation of the new logical volume, and containing the new logical volume as its base logical volume. Step 514 is followed by step 516, in which the snapshot group object counter that corresponds to the snapshot group identifier allocated to the newly created snapshot group to one.

Figure 6:
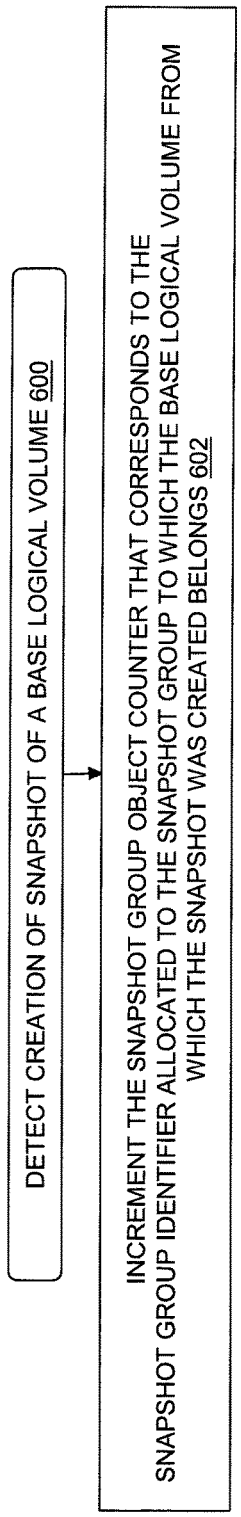
FIG. 6 is a flow chart showing an example of processing that may be performed in some embodiments in response to detecting the creation of a snapshot.

FIG. 6 is a flow chart showing an example of processing that may be performed in some embodiments in response to detecting the creation of a snapshot. The processing shown in FIG. 6 may, for example, be performed by the Namespace Layer 144 shown in FIG. 1. At 600, the creation of a snapshot of a base logical volume is detected. In response to detection of the creation of the snapshot at 600, at step 602 the snapshot group object counter that corresponds to the snapshot group identifier allocated to the snapshot group to which the snapshot belongs is incremented, e.g. the snapshot group object counter is incremented that corresponds to the snapshot group identifier allocated to the snapshot group that contains base logical volume from which the snapshot was created.

Figure 7:
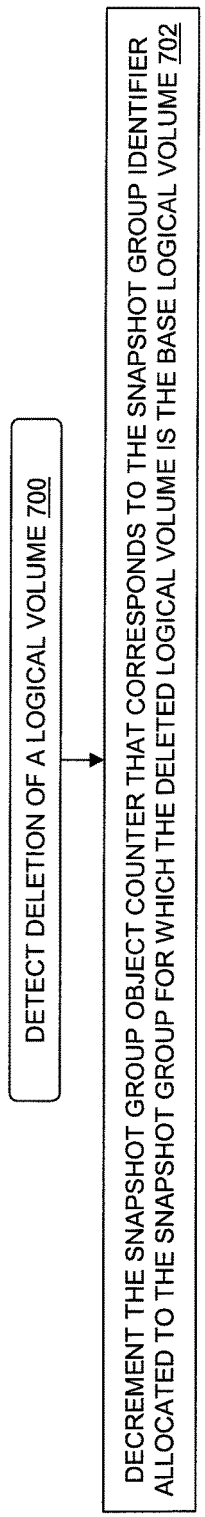
FIG. 7 is a flow chart showing an example of processing that may be performed in some embodiments in response to detecting the deletion of a logical volume.

FIG. 7 is a flow chart showing an example of processing that may be performed in some embodiments in response to detecting the deletion of a logical volume. The processing shown in FIG. 7 may, for example, be performed by the Namespace Layer 144 shown in FIG. 1. At 700, the deletion of a logical volume is detected. In response to detection of the deletion of the logical volume at 700, at step 702 the snapshot group object counter that corresponds to the snapshot group identifier allocated to the snapshot group to which the deleted logical volume belongs is decremented, e.g. the snapshot group object counter is decremented that correspond to the snapshot group identifier allocated to the snapshot group containing the deleted logical volume as its base logical volume.

Figure 8:
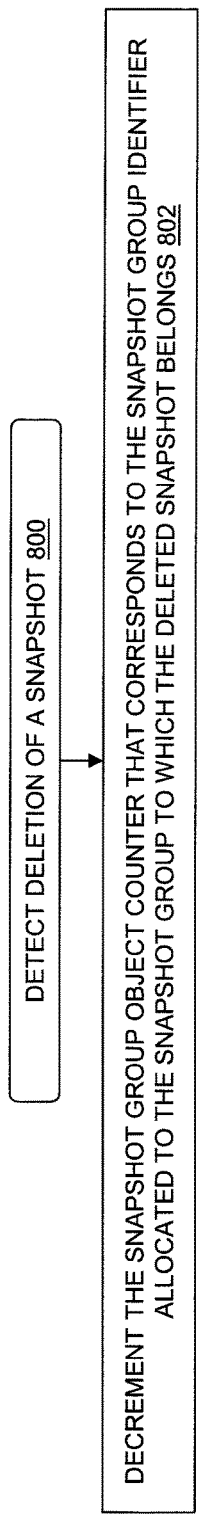
FIG. 8 is a flow chart showing an example of processing that may be performed in some embodiments in response to detecting deletion of a snapshot.

FIG. 8 is a flow chart showing an example of processing that may be performed in some embodiments in response to detecting deletion of a snapshot. The processing shown in FIG. 8 may, for example, be performed by the Namespace Layer 144 shown in FIG. 1. At 800, the deletion of a snapshot is detected. In response to detection of the deletion of the snapshot at 800, at step 802 the snapshot group object counter that corresponds to the snapshot group identifier allocated to the snapshot group to which the deleted snapshot belongs is decremented, e.g. the snapshot group object counter is decremented that corresponds to the snapshot group identifier allocated to the snapshot group containing the base logical volume from which the deleted snapshot was created.

Figure 9:
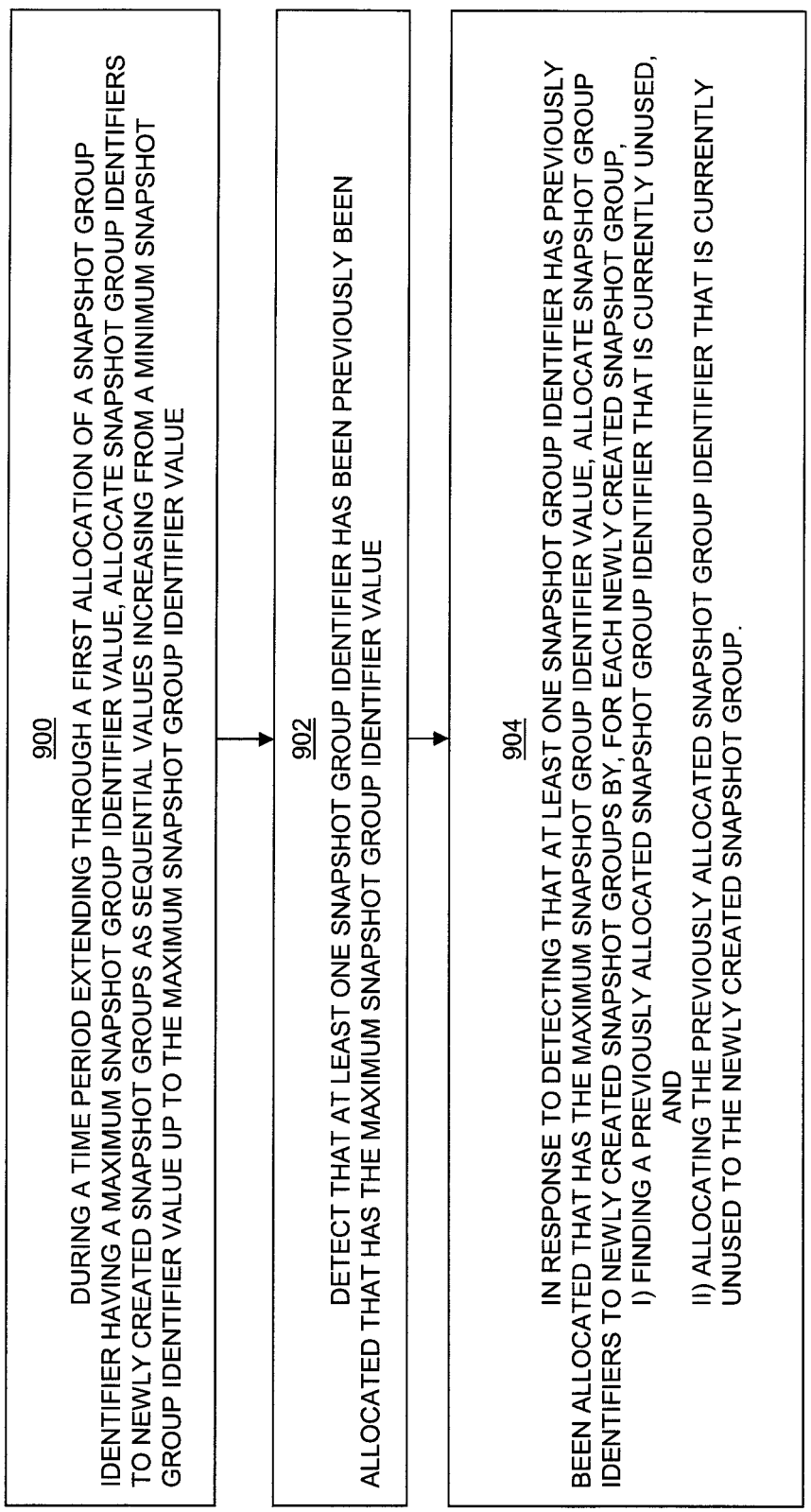
FIG. 9 is a flow chart showing an example of steps that may be performed in some embodiments.

FIG. 9 is a flow chart showing an example of steps that may be performed in some embodiments.

At step 900, during a time period extending through a first allocation of a snapshot group identifier having a maximum snapshot group identifier value, the disclosed technology may allocate snapshot group identifiers to newly created snapshot groups as sequential values increasing from a minimum snapshot group identifier value up to the maximum snapshot group identifier value.

At step 902, the disclosed technology detects that at least one snapshot group identifier has been previously been allocated that has the maximum snapshot group identifier value.

At step 904, in response to detecting that at least one snapshot group identifier has previously been allocated that has the maximum snapshot group identifier value, the disclosed technology allocates snapshot group identifiers to newly created snapshot groups by, for each newly created snapshot group, i) finding a previously allocated snapshot group identifier that is currently unused, and ii) allocating the previously allocated snapshot group identifier that is currently unused to the newly created snapshot group.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method of allocating snapshot group identifiers to snapshot groups, wherein each snapshot group is made up of a base logical volume and one or more snapshots created from that base logical volume, comprising:
   responsive to detecting that a snapshot group identifier having a maximum snapshot group identifier value has previously been allocated, subsequently allocating the snapshot group identifiers to newly created snapshot groups by, for each newly created snapshot group:
   finding a previously allocated snapshot group identifier that is currently unused, and
   allocating the previously allocated snapshot group identifier that is currently unused to the newly created snapshot group;
   during a time period extending through a first allocation of the snapshot group identifier having the maximum snapshot group identifier value, allocating the snapshot group identifiers to newly created snapshot groups as sequential values increasing from a minimum snapshot group identifier value up to the maximum snapshot group identifier value;
   creating a counter extent of snapshot group object counters, wherein the counter extent includes a corresponding snapshot group object counter for each snapshot group identifier in a range from the minimum snapshot group identifier value up to the maximum snapshot group identifier value;
   in response to detecting creation of each newly created snapshot group, setting the snapshot group object counter in the counter extent that corresponds to the snapshot group identifier allocated to the newly created snapshot group to one; and
   in response to detecting creation of a snapshot, incrementing the snapshot group object counter in the counter extent that corresponds to the snapshot group identifier allocated to the snapshot group to which a base logical volume from which the snapshot was created belongs.

2. The method of claim 1, further comprising:
   detecting creation of a logical volume; and
   wherein detecting the creation of the logical volume causes a new snapshot group to be created having the newly created logical volume as the base logical volume.

3. The method of claim 2, further comprising:
   detecting deletion of a logical volume;
   in response to detecting the deletion of the logical volume, decrementing the snapshot group object counter that corresponds to the snapshot group identifier allocated to the snapshot group for which the deleted logical volume is the base logical volume;
   detecting deletion of a snapshot; and
   in response to detecting the deletion of the snapshot, decrementing the snapshot group object counter that corresponds to the snapshot group identifier allocated to the snapshot group to which the deleted snapshot belongs.

4. The method of claim 3, further comprising;
   further in response to detecting the deletion of the logical volume, after decrementing the snapshot group object counter that corresponds to the snapshot group identifier allocated to the snapshot group for which the deleted logical volume is the base logical volume:
   checking whether the snapshot group object counter that corresponds to the snapshot group identifier allocated to the snapshot group for which the deleted logical volume is the base logical volume has a value of zero, and
   in response to detecting that the snapshot group object counter that corresponds to the snapshot group identifier allocated to the snapshot group for which the deleted logical volume is the base logical volume has a value of zero, modifying a counter search hint pointer to indicate a segment of counters within the counter extent that includes the snapshot group object counter that corresponds to the snapshot group identifier allocated to the snapshot group for which the deleted logical volume is the base logical volume.

5. The method of claim 4, further comprising:
further in response to detecting the deletion of the snapshot, after decrementing the snapshot group object counter that corresponds to the snapshot group identifier allocated to the snapshot group to which the deleted snapshot belongs:
checking whether the snapshot group object counter that corresponds to the snapshot group identifier allocated to the snapshot group to which the deleted snapshot belongs has a value of zero, and
in response to detecting that the snapshot group object counter that corresponds to the snapshot group identifier allocated to the snapshot group to which the deleted snapshot belongs has a value of zero,
modifying the counter search hint pointer to indicate a segment of counters within the counter extent that includes the snapshot group object counter that corresponds to the snapshot group identifier allocated to the snapshot group to which the deleted snapshot belongs.

6. The method of claim 5, further comprising:
wherein finding a previously allocated snapshot group identifier that is currently unused comprises finding a snapshot group object counter having a value of zero within the extent of snapshot group object counters; and
wherein allocating the previously allocated snapshot group identifier that is currently unused to the newly created snapshot group comprises allocating a snapshot group identifier equal to the snapshot group identifier corresponding to the snapshot object counter having a value of zero to the newly created snapshot group.

7. The method of claim 6, wherein finding the snapshot group object counter having a value of zero within the extent of snapshot group object counters comprises searching the segment of counters within the counter extent indicated by the counter search hint pointer to find the snapshot group counter having a value of zero.

8. The method of claim 7, wherein finding a previously allocated snapshot group identifier that is currently unused further comprises:
verifying whether the snapshot group identifier corresponding to the snapshot group object counter having a value of zero is not currently in use; and
allocating the snapshot group identifier corresponding to the snapshot object counter having a value of zero to the newly created snapshot group only in response to verifying that the snapshot group identifier corresponding to the snapshot group object counter having a value of zero is not currently in use.

9. A data storage system, the data storage system including processing circuitry and memory coupled to the processing circuitry, the memory storing instructions for allocating snapshot group identifiers to snapshot groups, wherein each snapshot group is made up of a base logical volume and one or more snapshots created from that base logical volume, wherein the instructions, when executed by the processing circuitry, cause the processing circuitry to:
responsive to detecting that a snapshot group identifier having a maximum snapshot group identifier value has previously been allocated, subsequently allocate the snapshot group identifiers to newly created snapshot groups by, for each newly created snapshot group, causing the processing circuitry to:
find a previously allocated snapshot group identifier that is currently unused, and
allocate the previously allocated snapshot group identifier that is currently unused to the newly created snapshot group;
during a time period extending through a first allocation of the snapshot group identifier having the maximum snapshot group identifier value, allocate the snapshot group identifiers to newly created snapshot groups as sequential values increasing from a minimum snapshot group identifier value up to the maximum snapshot group identifier value;
create a counter extent of snapshot group object counters, wherein the counter extent includes a corresponding snapshot group object counter for each snapshot group identifier in a range from the minimum snapshot group identifier value up to the maximum snapshot group identifier value;
in response to detecting creation of each newly created snapshot group, set the snapshot group object counter in the counter extent that corresponds to the snapshot group identifier allocated to the newly created snapshot group to one; and
in response to detecting creation of a snapshot, increment the snapshot group object counter in the counter extent that corresponds to the snapshot group identifier allocated to the snapshot group to which a base logical volume from which the snapshot was created belongs.

10. The data storage system of claim 9, wherein the instructions, when executed, further cause the processing circuitry to:
detect creation of a logical volume; and
wherein detection of the creation of the logical volume causes a new snapshot group to be created having the newly created logical volume as the base logical volume.

11. The data storage system of claim 10, wherein the instructions, when executed, further cause the processing circuitry to:
detect deletion of a logical volume;
in response to detection of the deletion of the logical volume, decrement the snapshot group object counter that corresponds to the snapshot group identifier allocated to the snapshot group for which the deleted logical volume is the base logical volume;
detect deletion of a snapshot; and
in response to detection of the deletion of the snapshot, decrement the snapshot group object counter that corresponds to the snapshot group identifier allocated to the snapshot group to which the deleted snapshot belongs.

12. The data storage system of claim 11, wherein the instructions, when executed, further cause the processing circuitry to:
further in response to detection of the deletion of the logical volume, after decrementing the snapshot group object counter that corresponds to the snapshot group identifier allocated to the snapshot group for which the deleted logical volume is the base logical volume:
check whether the snapshot group object counter that corresponds to the snapshot group identifier allocated to the snapshot group for which the deleted logical volume is the base logical volume has a value of zero, and
in response to detecting that the snapshot group object counter that corresponds to the snapshot group identifier allocated to the snapshot group for which the deleted logical volume is the base logical volume has a value of zero, modify a counter search hint pointer to indicate a segment of counters within the counter extent that includes the snapshot group object counter that corresponds to the snapshot group identifier allocated to the snapshot group for which the deleted logical volume is the base logical volume.

13. The data storage system of claim 12, wherein the instructions, when executed, further cause the processing circuitry to:
further in response to detection of the deletion of a snapshot, after decrementing the snapshot group object counter that corresponds to the snapshot group identifier allocated to the snapshot group to which the deleted snapshot belongs:
check whether the snapshot group object counter that corresponds to the snapshot group identifier allocated to the snapshot group to which the deleted snapshot belongs has a value of zero, and
in response to detecting that the snapshot group object counter that corresponds to the snapshot group identifier allocated to the snapshot group to which the deleted snapshot belongs has a value of zero, modify the counter search hint pointer to indicate a segment of counters within the counter extent that includes the snapshot group object counter that corresponds to the snapshot group identifier allocated to the snapshot group to which the deleted snapshot belongs.

14. The data storage system of claim 13, further comprising:
wherein the data storage system finds a previously allocated snapshot group identifier that is currently unused at least in part by finding a snapshot group object counter having a value of zero within the extent of snapshot group object counters; and
wherein allocation of the previously allocated snapshot group identifier that is currently unused to the newly created snapshot group comprises allocation of a snapshot group identifier equal to the snapshot group identifier corresponding to the snapshot object counter having a value of zero to the newly created snapshot group.

15. The data storage system of claim 14, wherein the data storage system finds the snapshot group object counter having a value of zero within the extent of snapshot group object counters at least in part by searching the segment of counters within the counter extent indicated by the counter search hint pointer to find the snapshot group counter having a value of zero.

16. The data storage system of claim 15, wherein the instructions, when executed, and while causing the processing circuitry to find a previously allocated snapshot group identifier that is currently unused, further cause the processing circuitry to:
verify whether the snapshot group identifier corresponding to the snapshot group object counter having a value of zero is not currently in use; and
allocate the snapshot group identifier corresponding to the snapshot object counter having a value of zero to the newly created snapshot group only in response to verification that the snapshot group identifier corresponding to the snapshot group object counter having a value of zero is not currently in use.

17. A non-transitory, computer-readable medium having instructions stored thereon that, when executed by processing circuitry in a data storage system, cause the processing circuitry to perform a method of allocating snapshot group identifiers to snapshot groups, wherein each snapshot group is made up of a base logical volume and one or more snapshots created from that base logical volume, the method comprising the steps of:
responsive to detecting that a snapshot group identifier having a maximum snapshot group identifier value has previously been allocated, subsequently allocating the snapshot group identifiers to newly created snapshot groups by, for each newly created snapshot group:
finding a previously allocated snapshot group identifier that is currently unused, and
allocating the previously allocated snapshot group identifier that is currently unused to the newly created snapshot group;
during a time period extending through a first allocation of the snapshot group identifier having the maximum snapshot group identifier value, allocating the snapshot group identifiers to newly created snapshot groups as sequential values increasing from a minimum snapshot group identifier value up to the maximum snapshot group identifier value;
creating a counter extent of snapshot group object counters, wherein the counter extent includes a corresponding snapshot group object counter for each snapshot group identifier in a range from the minimum snapshot group identifier value up to the maximum snapshot group identifier value;
in response to detecting creation of each newly created snapshot group, setting the snapshot group object counter in the counter extent that corresponds to the snapshot group identifier allocated to the newly created snapshot group to one; and
in response to detecting creation of a snapshot, incrementing the snapshot group object counter in the counter extent that corresponds to the snapshot group identifier allocated to the snapshot group to which a base logical volume from which the snapshot was created belongs.

* * * * *